United States Patent [19]

Lowrance

[11] 4,180,198
[45] Dec. 25, 1979

[54] APPARATUS FOR INSERTING STICKS INTO ARTICLES

[76] Inventor: Thomas F. Lowrance, 3601 Security St., Garland, Tex. 75040

[21] Appl. No.: 886,269

[22] Filed: Mar. 13, 1978

[51] Int. Cl.² ............................ B27F 7/00; B23Q 7/10
[52] U.S. Cl. ..................................... 227/120; 29/798; 29/809; 227/139
[58] Field of Search ................. 29/791, 795, 798, 809; 227/21, 26, 27, 120, 130, 139

[56] References Cited

U.S. PATENT DOCUMENTS

| | | | |
|---|---|---|---|
| 3,316,010 | 4/1967 | Lowrance | 144/60 X |
| 3,691,608 | 9/1972 | Lowrance | 227/139 |
| 4,069,960 | 1/1978 | Lowrance | 227/120 |

Primary Examiner—E. M. Combs
Attorney, Agent, or Firm—Peter J. Murphy

[57] ABSTRACT

A stick holder is an accessory having an elongated body rectangular in cross-section, and having support brackets at each end including extending arms and transverse legs. The holder body includes transverse passages for receiving and clamping sticks, which are ejected from an adjacent stick box or hopper and urged into food articles or other articles retained in an article holder on the opposite side of the stick holder. To locate the stick holder in desired relation to the stick box, the stick holder and the apparatus have coacting structure to prevent relative movement. Guide blocks are mounted on the sides of the apparatus, adjacent to the ends of the stick box, and coact with the stick holder support brackets to provide a broader support base eliminating rocking movement of the stick holder about a longitudinal axis, to prevent movement of the stick holder away from the stick box, and to locate the stick holder laterally with some precision relative to the stick box.

8 Claims, 8 Drawing Figures

U.S. Patent   Dec. 25, 1979   Sheet 3 of 3   4,180,198
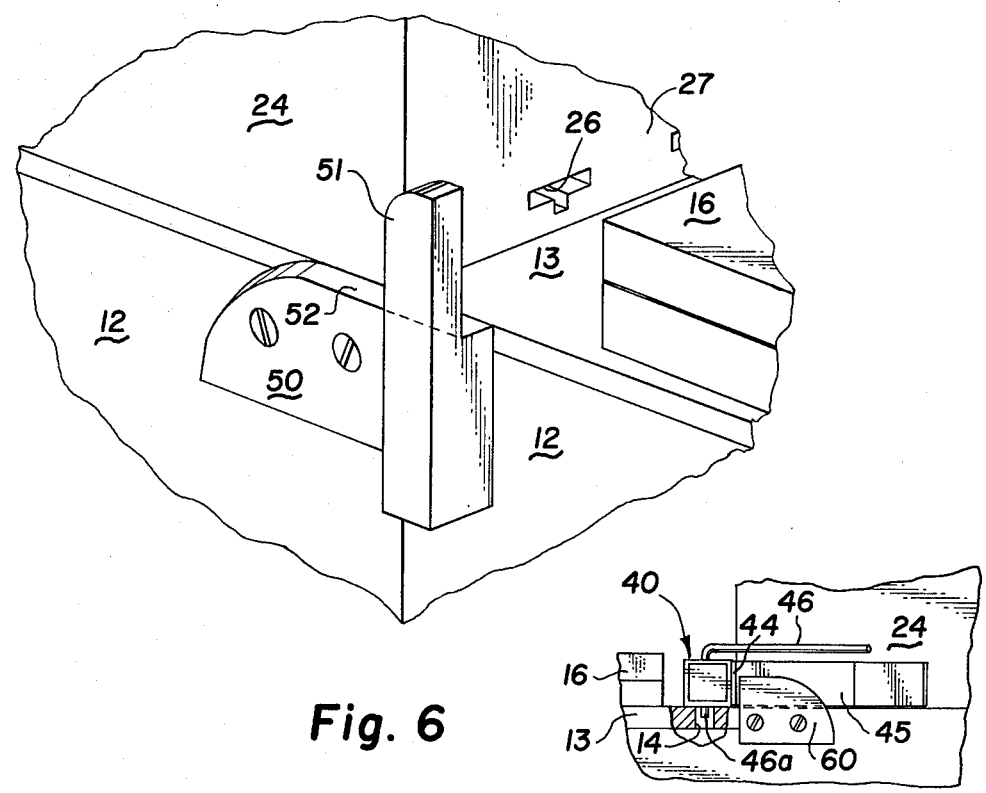
Fig. 6
Fig. 7
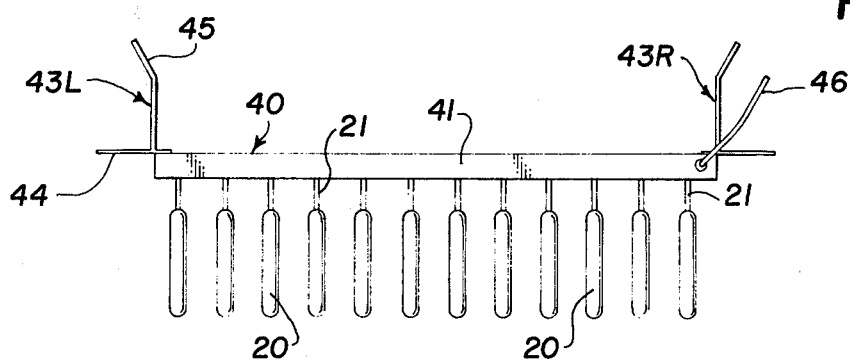
Fig. 8

APPARATUS FOR INSERTING STICKS INTO ARTICLES

BACKGROUND AND SUMMARY OF THE INVENTION

This invention relates to semi-automatic apparatus for inserting holder sticks into food articles such as wieners, or into other articles; which apparatus is of the type described in applicant's U.S. Pat. No. 3,691,608, issued Sept. 19, 1972, and applicant's U.S. Pat. No. 4,069,960 issued Jan. 24, 1978. More particularly, this invention relates to an improvement in apparatus of the type described in applicant's above mentioned patents.

In the present and prior forms of such apparatus, an accessory which is identified as a "stick holder" has been and is employed to grasp the distal ends of a group of holder sticks which have been driven into a group of wieners or other articles; and that stick holder is then used for transporting that group of assembled holder sticks and wieners for further processing or other handling. The stick holder is designed to be positioned between a stick feed box or hopper, and an article holder having chambers for retaining a plurality of wieners or other articles to enable the sticks to be inserted into these articles; and the stick holder is an elongated member having transverse passages through which the sticks pass prior to being clamped. Prior machines have not incorporated structure for locating and retaining the stick holder with the precision necessary to avoid occasional displacement of the stick holder from its operative position which displacement may result from the fact that the stick holder passages are not precisely aligned with the paths of the sticks which are ejected from the stick box.

A principal object of this invention therefore is to provide improved apparatus which obviates the above mentioned problem.

Another principal object of this invention is to provide improved apparatus which coacts with accessory stick holders, to locate and maintain the stick holders in the desired operative relation to the apparatus to minimize possible malfunction.

A further and more particular object of this invention is to provide improved apparatus and accessory stick holders having coating means for preventing rotational, front-to-rear, and lateral movement of the stick holders relative to the apparatus which movement may produce malfunctioning misalignment of the accessories relative to the apparatus.

These objects are accomplished in apparatus for inserting elongated sticks into articles, wherein the apparatus includes: an article holder having means for retaining a plurality of articles in spaced side-by-side relation; a stick box having a plurality of elongated stick feed grooves disposed in spaced, parallel side-by-side relation, in generally horizontal longitudinal alignment with the respective article retaining means of the article holder, and having means for supporting sticks overlying each feed groove for sequential feeding into each feed groove; means for pushing sticks disposed in the feed grooves longitudinally out of the grooves and partially into the article retaining means so that the articles are impaled thereon; and a stick holder comprising an elongated body removably positionable between the stick box and the article holder, the stick holder having a plurality of stick passage means disposed in spaced side-by-side relation for generally horizontal alignment with respective feed grooves of the stick box and with respective retaining means of the article holder. The stick holder has stick clamping means for clamping sticks in the passage means. The apparatus provides a support surface for the stick holder adjacent to the stick box. The improvement comprises: coacting means on the apparatus and on the stick holder for preventing rotation of the stick holder about a longitudinal axis; coating means on the apparatus and of the stick holder for limiting forward and rearward movement of the stick holder relative to the apparatus; and coacting means on the apparatus and on the stick holder for limiting lateral movement of the stick holder relative to the apparatus.

The novel features and the advantages of the invention, as well as additional objects thereof, will be understood more fully from the following description when read in connection with the accompanying drawings.

DRAWINGS

FIG. 6 is a fragmentary detail view illustrating the left guide block;

FIG. 7 is a fragmentary side view, partially broken away, further illustrating the operative position of the stick holder; and FIG. 8 is a top view of the stick holder with clamped sticks and impaled wieners.

DESCRIPTION OF THE PREFERRED EMBODIMENT

Figure 1:
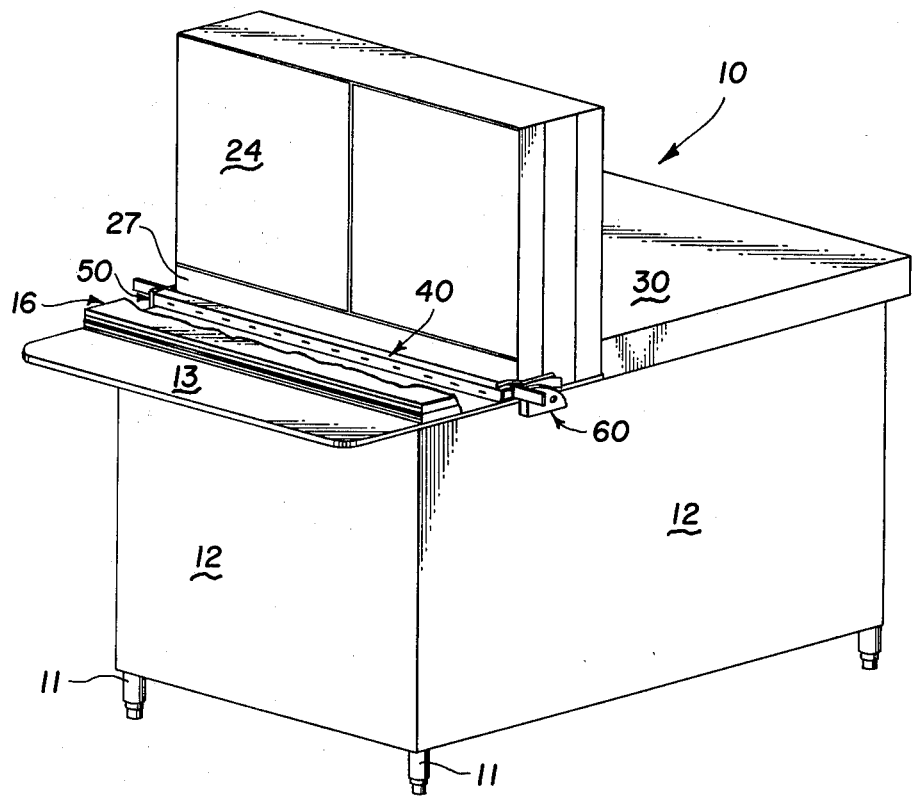
FIG. 1 is a perspective view of an apparatus for inserting sticks into articles, which apparatus embodies the invention.
Figure 3:
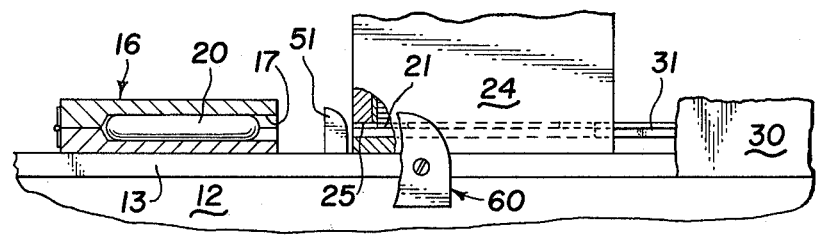
FIG. 3 is a fragmentary side view, partially in section, of the apparatus of FIG. 1.
Figure 4:
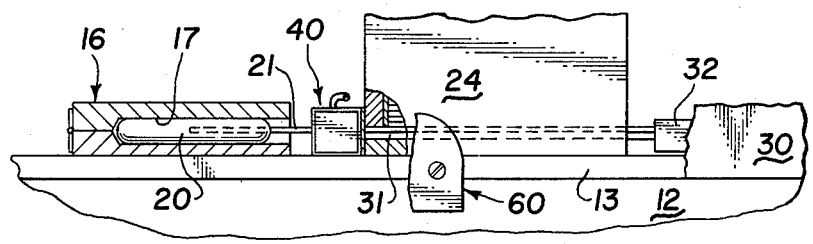
FIG. 4 is a view similar to FIG. 3, with the stick holder in operative position.

Applicant's U.S. Pat. Nos. 3,691,608 and 4,069,960 describe two forms of apparatus, of which the invention of this application is an improvement. The drawings of this application, particularly FIGS. 1, 3 and 4, are more closely identified with applicant's U.S. Pat. No. 4,069,960 relating to apparatus for inserting flat sticks into wieners; and reference may be had to that patent specification for detailed description of the structure and operation of the basic apparatus and the several components thereof.

Referring particularly to FIG. 1, and also to FIGS. 3 and 4, there is shown the overall form of the basic apparatus 10 and the stick holder accessory 40. The apparatus 10 is a free standing apparatus consisting of a frame which includes supporting legs 11 and which is enclosed by a sheet metal skirt 12 for example, and supports a support plate or table 13 upon which are mounted several components of the apparatus. The front end of the apparatus appears at the front left in FIG. 1, being the end at which wieners are loaded into and removed from the wiener holder 16 mounted on the support plate 13. A wiener holder is a laterally elongated member having a hinged top, and which provides a plurality of wiener chambers 17 which are elongated from front to rear and disposed in laterally spaced parallel relation. These chambers open toward the rear of the apparatus; and the chambers are designed to confine, relatively closely, and therefore retain wieners 20 to enable sticks 21 to penetrate the wieners as will be described. The sticks 21, then, become the "holder stick" for wieners which are to be processed as "corny dogs", for example. The wieners may be placed in the several chambers either manually or by automatic means. The wiener holder 16 may have twelve side-by-side wiener chambers 17, for example.

Figure 5:
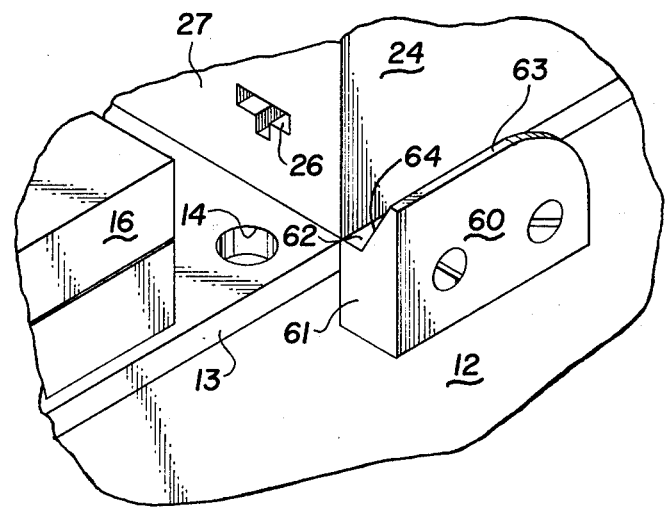
FIG. 5 is a fragmentary detail view illustrating the right guide glock.

A stick box or stick hopper 24 is mounted on the support plate 13, to the rear and spaced from the wiener holder 16. The stick box is also laterally elongated relative to the apparatus and includes at its base twelve stick feed grooves 25 spaced in parallel side-by-side relation and longitudinally aligned with the wiener chambers 17. FIGS. 5 and 6 of the drawing illustrate discharge openings 26 for the emergence of flat sticks 21 from the feed box, these openings being T-shaped. The stick box also includes hopper means for containing a supply of sticks and feeding same into the respective feed grooves 25. U.S. Pat. No. 3,691,608 particularly illustrates a hopper for the handling of sticks 21 which may be round in cross-section; and U.S. Pat. No. 4,069,960 illustrates principally a stick box for the handling of sticks 21 which are rectangular in cross-section, i.e. flat sticks; and the drawings in this application are identified with apparatus for the handling of flat sticks 21.

The mechanism for pushing or ejecting the sticks 21, from the feed grooves 25 of the feed box into the wieners 20 in the wiener chambers 17, is mounted on the support plate 13 at the rear of the apparatus 10 and is enclosed within a housing 30 for example. This feed mechanism includes twelve push rods 31 which are disposed in longitudinal alignment with respective feed grooves 25, with the distal ends of the push rods being supported continuously within the feed grooves, and with the proximal ends being supported by a push bar 32 which reciprocates the twelve push rods simultaneously. The push bar is reciprocated by any suitable mechanism, such as a pneumatically operated mechanism controlled by a suitable foot control valve mounted near the bottom front of the apparatus for example. FIG. 3 illustrates the push rods at the rearward limited movement, where sticks 21 are allowed to feed into the respective stick feed grooves 25; and FIG. 4 illustrates the push rods at the forward limit of movement wherein the respective sticks 21 have been pushed forward or ejected from the stick box and into the respective wieners 20, with the wieners then being impaled on the sticks 21.

Figure 2:
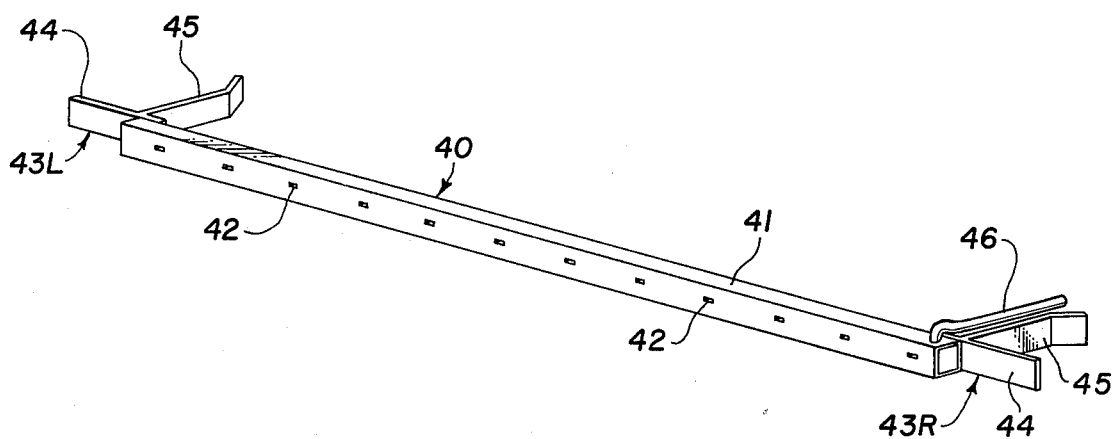
FIG. 2 is an enlarged perspective view of a stick holder for use with the apparatus of FIG. 1.

FIGS. 1, 4 and 7 illustrate the stick holder 40 in operative position relative to the apparatus; and FIGS. 2 and 7 illustrate some details of the stick holder. FIG. 8 illustrates the assembly of the stick holder 40 and clamped sticks 21 and impaled wieners 20, after removal from the apparatus; which assembly is then used for the further processing of the wieners, such as dipping in a corn dog batter, and possibly the cooking of the wieners if that is done at the same processing plant. The same assembly may be used for a packaging operation or for transporting the wieners to the packaging apparatus or station.

FIGS. 2 and 8 of the drawing illustrate some external details of the stick holder 40; and reference may be had to applicant's U.S. Pat. No. 3,316,010 issued Apr. 25, 1967 for a more complete description of a stick holder suitable for use in the present invention. Reference may also be had to applicant's U.S. Pat. No. 3,691,608, which includes a detailed description of a stick holder as described herein. As best seen in these figures, the stick holder body 41 is an elongated tubular member rectangular in cross-section, having a plurality of longitudinally spaced pairs of elongated slots 42 which are dimensioned sufficiently large to allow the passage of flat sticks 21 transversely through the body. Secured to the body, at each end, are left and right support brackets 43L and 43R, each of which includes longitudinally extending arms 44 and transversely extending legs 45 having outwardly flared tips. These brackets serve, in part, to guide and locate the holder relative to the apparatus as will be described, serve as support handles for the handling of the assembly of the stick holder, sticks and wieners illustrated in FIG. 7, and the arms 44 particularly may serve as support brackets for supporting the stick holders in suitable racks or conveyors for example.

The stick holder body 41 may have an outer transverse dimension of 1 inch square for example; and the width of the legs and arms may be 1 inch so that the edges of these members define extensions of the top and base surfaces of the body.

The operating mechanism for the stick holder may include an internal sleeve, relatively slidable, and having the same alignment of transverse slots to enable pass through of the sticks 21 in one position and to effect binding of the sticks when the sleeve is urged in one direction from the pass through alignment position. An operating handle 46 may be rotated from the FIG. 2 position to the FIG. 8 position to shift the apparatus to the stick clamping condition. As best seen in FIG. 7, the handle 46 is a generally L-shaped member, one end 46a of which projects from the bottom surface of the holder body.

For supporting stabilizing and locating the stick holder 40 relative to the apparatus 10, during the operation of the apparatus, a left guide block 50 and a right guide block 60 are mounted on the apparatus in particular relation to the horizontal support surface provided by the support plate 13 and to the stick box. The support plate 13, immediately in front of the stick box 24, provides the basic horizontal support surface for the stick holder; and portions of the left and right guide blocks define extensions of this surface as will be described. The legs 45 of the stick holder brackets are spaced apart to accommodate the length of the stick box; and these legs with the flared tips serve to guide the stick holder into position against the forward face 27 of the stick box, which fixes the forward-rearward position of the stick holder. Since the legs 45 function only as guides, they are dimensioned to allow some lateral movement of the stick holder; and a more precise lateral locating structure is provided by the right guide block 60 as will be described.

To prevent forward movement of the right end of the stick holder away from the stick box, the projecting tip 46a of the operator handle 46 is received with a recess 14 in the support plate as best seen in FIGS. 5 and 7. Forward movement of the left end of the stick holder is limited by coaction of the left bracket arm 44 and a vertically projecting finger 51 of the left guide block 50.

As best seen in FIG. 6, the left guide block 50 is mounted on the left side of the apparatus, extending both forwardly and rearwardly relative to the front wall 27 of the stick box. This guide block defines an upper horizontal edge surface 52 which is an extension of the upper support surface provided by the support plate 13, and extends both laterally to the left and rearwardly beyond the stick box surface 27. This edge surface 52 provides a support surface for the left bracket leg 45 which serves to stabilize the stick holder against rocking or rotating movement relative to a longitudinal axis of the stick holder. The finger 51, as seen in the drawings projects upwardly from the support surface 52 and is spaced laterally from the stick box 24 and forwardly from the stick box face 27 as best seen in FIG. 3. This finger, then, provides space for the stick holder leg 45 to pass between the finger and the adjacent side wall of the stick box, and provides space for the stick holder arm 44 to lie behind the finger 51 and prevent forward movement of the left end of the stick holder.

As best seen in FIG. 5, the right guide block 60 is mounted on the apparatus adjacent to the right side wall of the stick box 24 at its base. This guide block has a forward end face 61 which is disposed in the plane of the stick box front face 27, provides a support surface 62 in the same plane as the upper surface of the support plate 13 and which extends rearwardly along the right side of the stick box 24, and a cam rib 63 extending upwardly from the support surface 62 parallel with the stick box side wall and having an inclined cam surface 64 which extends upwardly and outwardly from the support surface 62. The support surface 62 provides a support for the leg 45 of the right support bracket 43R, in the same manner as does the left block support surface 52, to stabilize the stick holder against rocking movement. The cam rib 63 coacts with the right bracket leg 45 to laterally locate the stick holder relative to the apparatus, when the stick holder is placed in its operative position; this to assure that the stick holder slots 42 are precisely aligned with the stick box discharge openings 26 in order to obviate any malfunction of the apparatus due to misalignment.

OPERATION

A brief description of a portion of the operation will serve to explain the functions of the structure above described. At the beginning of an operating sequence, the several wieners 20 are placed in the appropriate chambers 17 of the wiener holder 16 by raising the hinged cover. A stick holder 40 is then placed in position, with its operating handle positioned as indicated in FIG. 2 to allow passage of sticks 21 through the stick holder passages 42. The stick holder is guided into position with the legs 45 spanning the stick box, with the body 41 moved against the stick box face 27 to position the left bracket arm 44 behind the guide block finger 51 and to locate the handle extension 46a within the recess 14. In so positioning, the right guide block cam rib 63 will shift the stick holder laterally as necessary for precise alignment. The stick holder is then stabilized by the vertical support surfaces 13, 52 and 62 against rocking movement. It is confined against front-to-rear movement by the stick box face 27, the finger 51 and the recess 14. And, it is prevented from lateral movement by the coaction of the right guide block cam surface 64 and the right bracket leg 45.

After the apparatus has been operated to urge the several holder sticks 21 forward into the wieners 20, as illustrated in FIG. 4, the stick box operating lever 46 is rotated, to the position illustrated in FIG. 7 for example, which then effects the clamping of the distal ends of the holder sticks 21. For removal of the assembled stick holder, holder sticks and wieners, the cover of the wiener holder 16 is lifted and the assembly may then be removed from the apparatus by grasping the right and left brackets 43L and 43R and moving the assembly to an appropriate rack or conveyor for example. The apparatus is then ready for a succeeding cycle with another stick holder. Obviously, in a high production operation, a large number of stick holders will be required.

What has been described is improved apparatus for the inserting of sticks into articles, particularly the inserting of holder sticks into wieners for the processing of "corn dogs" for example. This improvement, concerned with the positioning of stick holders for the subsequent handling of the assembled wieners and holder sticks, is important particularly from the standpoint of minimizing malfunction of the apparatus resulting in expensive slowdown of the apparatus operation for correcting such malfunctions.

While the preferred embodiment of the invention has been illustrated and described, it will be understood by those skilled in the art that changes and modifications may be resorted to without departing from the spirit and scope of the invention.

What is claimed is:

1. In apparatus for inserting elongated sticks into articles, wherein the apparatus includes: an article holder having means for retaining a plurality of articles in spaced side-by-side relation; a stick box having a plurality of elongated stick feed grooves disposed in spaced, parallel side-by-side relation, in generally horizontal longitudinal alignment with the respective article retaining means of said article holder, and means for supporting sticks overlying each feed groove for sequential feeding into each feed groove; means for pushing sticks disposed in said feed grooves longitudinally out of said grooves and partially into said article retaining means; and a stick holder comprising an elongated body removably positionable between said stick box and said article holder, said stick holder having a plurality of stick passage means disposed in side-by-side relation for generally horizontal alignment with respective feed grooves of said stick box and with respective retaining means of said article holder; said stick holder having stick clamping means for clamping sticks in said passage means; and a support surface for said stick holder adjacent to said stick box; the improvement comprising:

at least one leg mounted on said stick holder body and projecting transversely therefrom adjacent to one end; a guide block mounted on said apparatus providing a horizontal support surface for said leg; said guide block support surface and said projecting leg defining means for preventing rotation of said stick holder about its longitudinal axis;

coacting means on said apparatus and on said stick holder for limiting forward and rearward movement of said stick holder relative to said apparatus;

and coating means on said apparatus and on said stick holder for limiting lateral movement of said stick holder relative to said apparatus.

2. Apparatus as set forth in claim 2
one wall of said stick holder body defining a base surface;
one edge of said stick holder leg defining a support edge disposed in the plane of the stick holder base surface and defining an extension thereof; and said guide block support surface being disposed in the plane of said support surface for said stick holder, and defining an extension thereof.

3. Apparatus as set forth in claim 1
said stick box providing a stop for limiting rearward movement of said stick holder; said apparatus having structure coacting with mating structure at the opposite ends of said stick holder, defining a stop for limiting forward movement of said stick holder;
and said guide block having an upwardly projecting finger defining one of said stops for limiting forward movement.

4. Apparatus as set forth in claim 1
said guide block having means defining a support groove, the base of said support groove defining said leg support surface; said support groove including a camming surface inclined upwardly and outwardly from said leg support surface, said camming surface with said leg defining said means for limiting lateral movement of said stick holder.

5. Apparatus as set forth in claim 1
said stick holder having a second leg projecting in the same direction from said body, adjacent to the other end thereof;
said legs having outwardly flared distal ends; and said legs being spaced apart to receive said stick box, to guide said stick holder into its operative position relative to said stick box.

6. Apparatus as set forth in claim 1
said stick holder having a second leg projecting in the same direction from said body, adjacent to the other end thereof; one of said legs coacting with said first named guide blocks;
a second guide block mounted on said apparatus having means defining a support groove; the base of said support groove providing a horizontal support surface for the other of said projecting legs;
said second guide block groove including a camming surface inclined upwardly and outwardly from said leg support surface, said camming surface with a respective stick holder leg defining said means for limiting lateral movement of said stick holder.

7. Apparatus as set forth in claim 6
said first named guide block having an upwardly projecting finger defining a stop coacting with said stick holder for limiting forward movement of said stick holder at one end.

8. Apparatus as set forth in claim 7
said stick holder having an operator handle having a tip projecting from its base surface;
said apparatus support surface having a recess adjacent to said second guide block dimensioned to receive said operator handle tip; and said recess and said operator handle tip coacting to define means for limiting forward movement of said stick holder at one end thereof.

* * * * *